Sept. 28, 1926.　　　　　　　　　　　　　1,601,275
S. P. WATT
POWER TRANSMISSION MECHANISM
Filed Feb. 24, 1925　　2 Sheets-Sheet 2

SERN P. WATT,
INVENTOR.

BY
Pierre Barnes
ATTORNEY

Patented Sept. 28, 1926.

1,601,275

UNITED STATES PATENT OFFICE.

SERN P. WATT, OF SEATTLE, WASHINGTON.

POWER-TRANSMISSION MECHANISM.

Application filed February 24, 1925. Serial No. 11,161.

This invention relates to power transmission mechanism; and its object, generally, is the provision of improved mechanism of this character for rotating a driven member, selectively, in the same or opposite rotative direction as the driving member, and at various speed ratios with respect thereto.

A specific object of the invention is the provision of power transmission mechanism including a system of toothed gears in continuous mesh with each other, and cooperating friction coupling or retarding devices whereby the starting, stopping and speed changes of the driven member are effected without shock or danger of stripping the teeth from said gears.

Another specific object is the provision of simple and conveniently operated means for regulating the transmission mechanism to effect progressive changes from high to lower speeds, and vice versa, or for reversing the rotative direction of the driven member, during or prior to the operation of the driving member.

Still other objects and advantages of the invention will appear in the following specification.

The invention consists in the novel construction, adaptation, arrangement and combination of parts hereinafter described and claimed.

In the accompanying drawings,—

Figure 1:
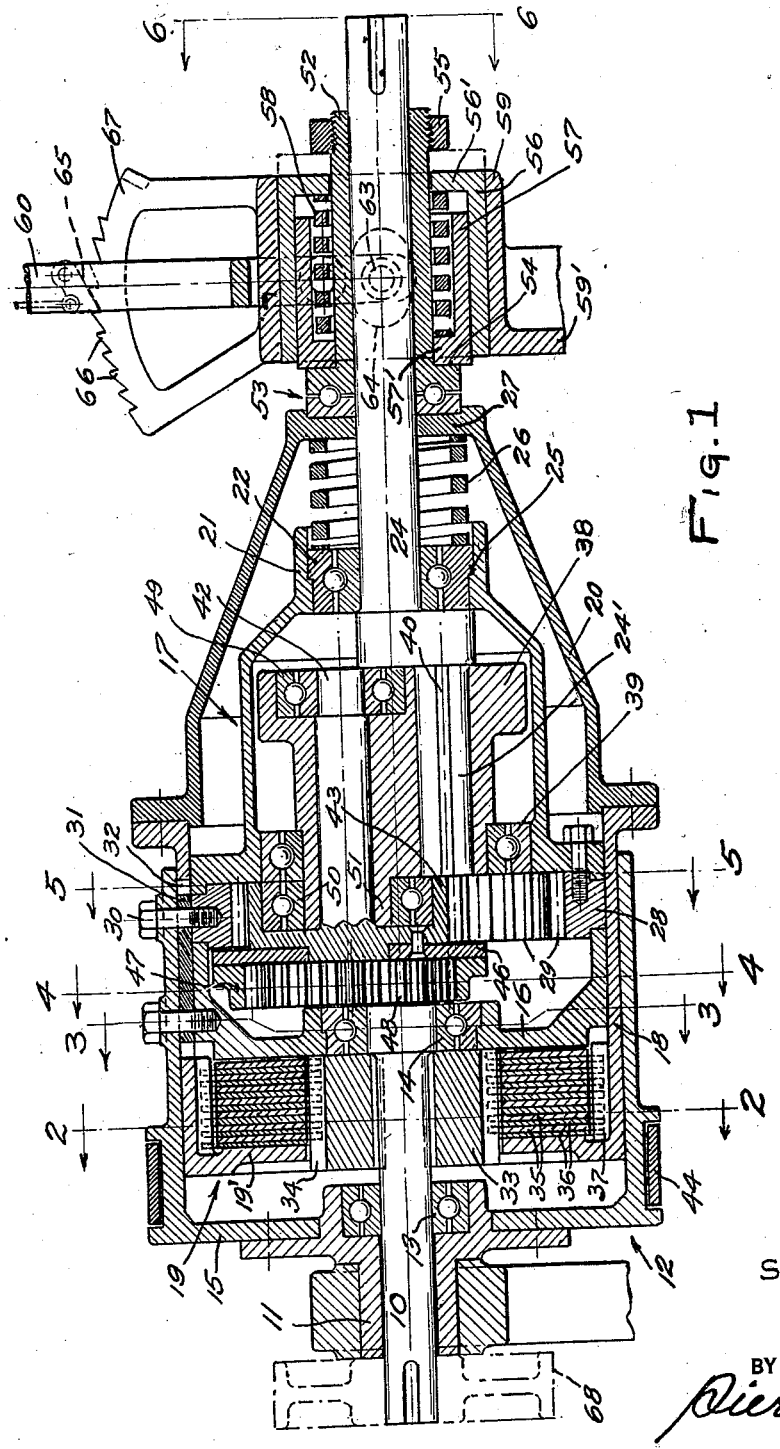
Figure 2:
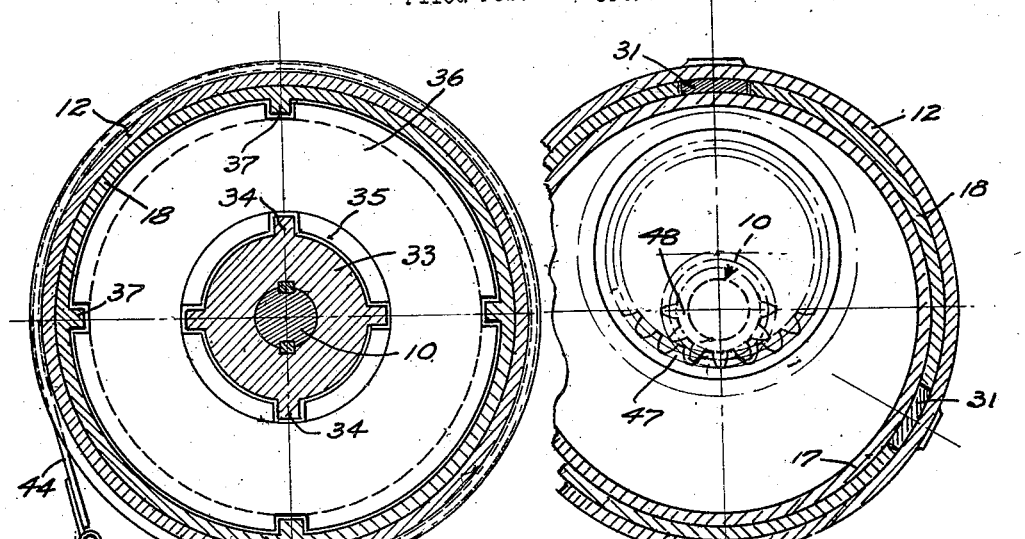
Figure 4:
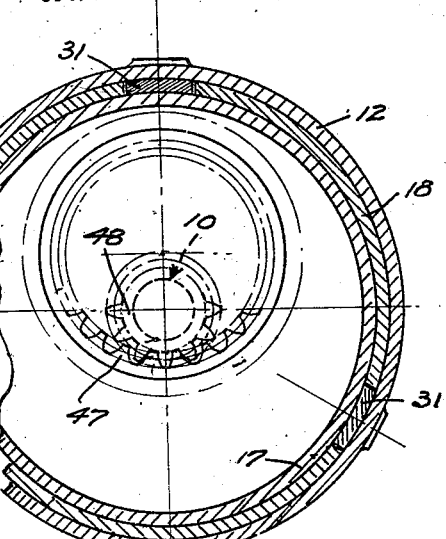
Figure 3:
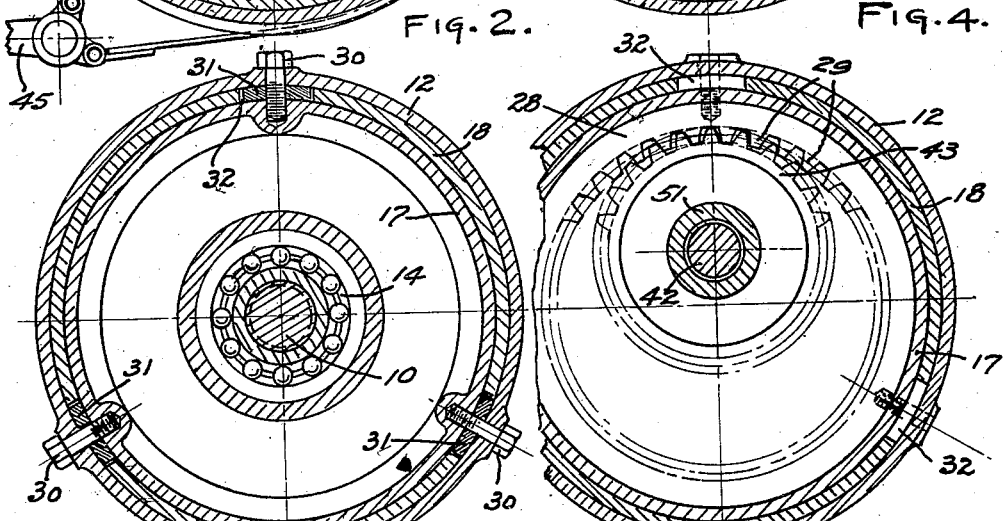
Figure 5:
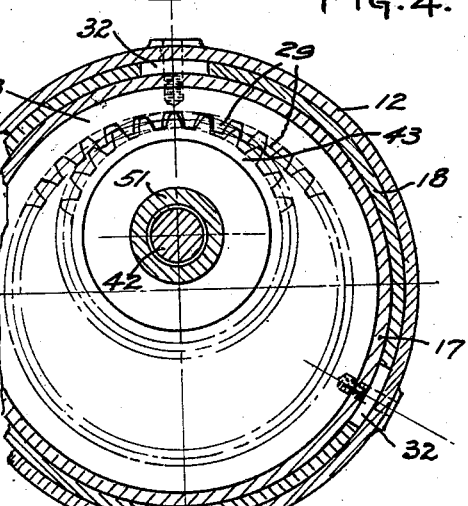
Figure 6:
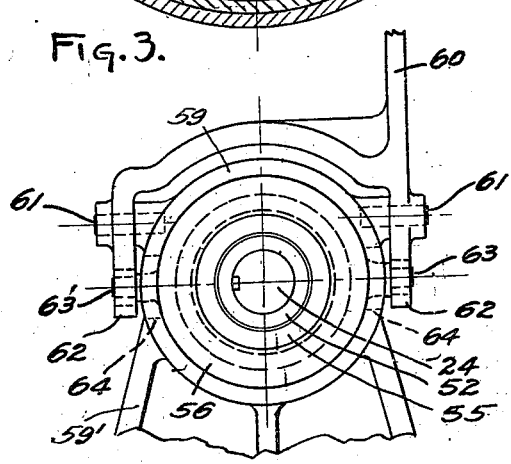

Figure 1 is a vertical longitudinal section of power transmission mechanism embodying my invention. Figs. 2, 3, 4, and 5, are transverse sectional views on lines 2—2, 3—3, 4—4, and 5—5 of Fig. 1; and Fig. 6 is an elevation of the right hand end of Fig. 1, as denoted by broken line 6—6 thereon.

In said drawings, the reference numeral 10 indicates a shaft extending axially through a boss 11 which is rigid with the end wall 15 of an external cylindrical housing member 12, hereinafter designated as the housing, said shaft being journaled in spaced apart bearings 13 and 14 provided within said housing.

As shown, the bearing 13 is mounted in the housing end wall 15; and the bearing 14 is mounted in the head element 16 of an inner housing member, or gear casing, as hereinafter designated, which is indicated generally by 17.

Said casing is of less diameter than the interal bore of the housing 12 to afford therebetween an annular space to receive the peripheral wall 18 of a shell 19 having an extension 20 outside of the housing.

Provided in the outer end 21 of the casing is a bushing 22 constituting, in effect, a part of said casing and also serving as the outer member of journal bearing devices for a shaft 24.

In practice, either of the shafts 10 or 24 may be employed as the driving member of the transmission mechanism and the other as the driven member; or the housing 12 may be utilized as the driving member with one of said shafts as the driven member as will be presently explained.

As shown, the outer end 21 of said casing is provided interiorly with an annular shoulder 25 against which the bushing 22 is held by means of a helical thrust spring 26 which is interposed between said bushing and the end wall 27 of the shell extension 20.

For convenience of manufacture, and to afford access to its interior, said gear is composed of a plurality of rigidly connected parts including the aforesaid head element 16 and a ring element 28 formed in its inner periphery with spur teeth 29 and constituting an internal gear.

Said casing, including the internal gear, is rigidly secured to the housing 12 as by means of screw bolts 30 passing through plates 31 (Figs. 1 and 3) which are movable endwise in slots 32 of the shell wall 18 to afford axial movement of the shell with respect to the united housing and casing members, but coupling the shell therewith for conjoint rotary movement.

Rigid with the shaft 10 is a hub 33 (Figs. 1 and 2) which is provided in its periphery with one or more splines 34 engaging in notches of a series of clutch discs 35 which are arranged in alternating order with a series of clutch discs 36 which are connected to the shell wall 18 as by means of splines 37 for relative axial movement.

The shaft 24 is secured in axial alignment to a drum 38 within the gear casing 17, said drum being advantageously journaled in ball bearings 39.

As illustrated, the drum 38 is secured to the shaft 24 by providing the latter with a crank pin 24¹ which is secured as by means of a key 40 within an opening provided therefor in the drum.

Provided within said drum and eccentrically of the axis of shafts 10 and 24 is an intermediate shaft 42 having integral therewith a spur gear 43 whose teeth are in continuous mesh with the teeth of the internal gear 28 for relative orbital motion therewith.

The internal gear 28 is, itself, driven in unison with the housing 12 and shell 19 unless the same are prevented from rotating by means of a brake band 44 (Figs. 1 and 2) engaging the outer periphery of the housing when actuated as by means of a brake operating lever 45.

In addition to the spur gear 43 said intermediate shaft has mounted thereon, or as shown, has secured to it by means of a disk plate 46, an internal gear 47 in continuous mesh with a spur pinion 48 which is rigid upon the shaft 10. 49 and 50 denote ball bearings carried by the drum 38 for the intermediate shaft—the ball bearing 50 being located between a boss element 51 of the drum and the inner periphery of the spur gear 43.

Included in the invention are controlling means for effecting axial movement of the casing in opposition to the spring 26 to regulate the action of the aforedescribed clutch devices. As illustrated, said controlling means consists of a sleeve 52 rotatively mounted upon the shaft 24 and is separated from the shell end 27 by ball thrust bearing 53.

Loosely mounted upon the sleeve 52, between the sleeve shoulder 54 and an adjusting nut 55 on the sleeve, is an annular body herein illustrated as a cage comprising two cylindrical parts 56 and 57 telescopically arranged, one within the other, to accommodate a helical spring 58 between the end flanges 56¹ and 57¹ of the respective cage parts. It is to be understood, however, that the cage may be formed integral and the spring omitted, although the two-part construction with an intervening spring or other yielding element is desirable.

The outer cage part 56 is shiftable endwise within the bearing box element 59 of a stationary standard 59¹ to regulate the effective pressure of the spring 58 in opposition to the spring 26.

The shifting of the cage part 56 axially of the shaft 24 is attained by any suitable means, the means shown consisting of a forked lever 60 fulcrumed to pivot pins 61 (Fig. 6) on the box 59 and having the lever bifurcations 62 connected to studs 63 which extend from diametrically opposite sides of the cage part 56 through elongated holes such as 64 provided in the bearing box 59.

For maintaining the cage part 56 in set positions axially of the shaft 24, there is provided upon the lever 60 a pawl 65 engageable, selectively, with any one of a series of teeth 66 of a stationary sector shaped frame member 67.

It is to be noted that the spring 26 acting between adjacent ends 21 and 27 of the casing 17 and the shell extension 20 tends to impart axial motion to the shell in a manner to cause the shell head 19¹ to approach the casing head 16 for engaging the complementary clutch disks 35 and 36 with each other and also with the respective heads 16 and 19¹.

When the clutch is thus engaged the shaft 10, through the medium of the hub 33, is coupled with the gear casing 17 and housing 12 for conjoint rotary motion.

The spring 26 may, however, be rendered incapable of setting the clutch, or partially so, through the instrumentality of the cage 56—57 when the latter is employed to shift the shell 17 in a manner to overcome the power of the spring 26 and cause the shell-head 19¹ to be moved from its clutch engaging position whereupon, the shaft 10 is free to rotate independently of the housing, casing, etc., subject to the action of the shaft pinion 48.

Broken lines 68 represents a pulley which may be keyed or otherwise secured to the shaft 10 to receive a power belt (not shown) for driving this shaft.

Assuming the shaft 10 is to be employed as the driving member and the shaft 24 as the driven member, the operation of the invention is as follows: While the multiple disc clutch is disengaged, the gears 47, 28 and 43 are free to revolve producing no rotation in the shaft 24. Now when the clutch is applied the result is that the plates serve to hold the hub 33 and the shell in a fixed relation, i. e., one cannot revolve within the other.

The amount of this frictional restraint will determine the rotational effect upon the shaft 24 which can be made to gradually increase in speed until the speed of the shaft 10 is reached in which condition there is no movement of any one gear with relation to another and consequently no gear wear obtains at high speed forward. It also follows that any reduction of speed is attained by a partial release of the clutch. This partial release is accomplished by a differential relation of the pressures of the springs 26 and 58. These pressures being positively controlled in the manner set forth allow of practical control of resulting pressure on the clutch. The reversal of the direction of rotation of shaft 24 is accomplished by first releasing the plate clutch and then applying the brake band 44 to housing 12 which effects the retarding or wholly stopping of the internal gear 28. The rotational speed in this case is controlled by the amount of brake action applied. It will be evident that the reverse speed at its maximum is a reduced speed as far as the shaft 10 is concerned.

The transmission may also be operated by utilizing the shaft 24 as the driver and the shaft 10 as the driven member; in which case the gearing would function directly opposite to that explained with reference to the above example, and subject to the control of the clutch.

Another way of operating said mechanism is by employing the housing 12 as the driving member, the same being rotated, for example, through the medium of a power belt in lieu of the band 44, the operation then will be as follows: A brake band in this case may or may not be applied to the pulley 68. When no brake band is applied and the clutch is free, no movement results in the driven shaft 24. If now the brake band is applied, the pinion 48 is held stationary, and the shaft 24 will be rotated at a relatively reduced speed with reference to the housing 12; but, if the the brake is released and the clutch is applied, the result will be transmitting the full speed of the housing to the shaft 24. The control of the speed is attained through the regulation of the clutch.

What I claim is—

1. In power transmission mechanism, a driving shaft, a driven shaft in axial alignment with each other, an intermediate shaft disposed parallel with and in eccentric relation with the aforesaid shafts, an internal gear disposed concentrically of the axis of the two first named shafts, a second internal gear concentric to the axis of said intermediate shaft and rotatable with the latter, a spur gear mounted upon said intermediate shaft and in mesh with the first named internal gear, a spur gear mounted upon one of the first named shafts and in mesh with the second named internal gear, and devices for controlling said gears to effect speed changes of the driven shaft with respect to the driving shaft.

2. In power mechanism as defined in claim 1, means acting independently of the devices referred to for retarding and stopping selectively the rotation of the first named internal gear to impart reverse rotation to the driven shaft.

3. In power transmission mechanism, a housing, a shell extending into the housing and arranged for relative axial movement, a driving shaft and a driven shaft disposed in axial alignment with each other and with respect to said housing and the shell, an intermediate shaft disposed parallel with the aforesaid shafts, an internal gear disposed concentric of the intermediate shaft and rotatable therewith, a spur gear mounted upon the driving shaft and in mesh with said internal gear, an internal gear rigid with said housing, a spur gear mounted upon the intermediate shaft and in mesh with the second named internal gear, clutch devices provided within the housing to afford coupling means between the driving shaft and said shell, and yieldable means acting through the medium of the shell for effecting the operation of said clutch devices to regulate the action of the latter for the purpose of controlling the force transmitted from the driving shaft to the driven shaft.

4. Power transmission mechanism comprising a driving shaft, a driven shaft, a housing mounted for relative rotary motion upon both of the shafts, an intermediate shaft revolubly carried by said driven shaft, an internal gear rotatable with said housing, a spur gear mounted upon the intermediate shaft and engaging said internal gear for planetary motion with respect thereto, an internal gear carried by said intermediate shaft, a spur gear mounted upon said driving shaft and in mesh with the second named internal gear, friction clutch devices provided within said housing for coupling the first named internal gear with the driving shaft, and means extending into the housing for regulating said clutch devices.

5. In power transmission mechanism as defined in claim 4, manually actuated devices for controlling the clutch regulating means.

Signed at Seattle, Washington, this 9th day of February, 1925.

SERN P. WATT.